United States Patent
Wedowski

(10) Patent No.: US 9,573,005 B2
(45) Date of Patent: Feb. 21, 2017

(54) PROTECTION DEVICE

(71) Applicant: CHS GMBH, Berlin (DE)

(72) Inventor: Michael Wedowski, Jueterbog (DE)

(73) Assignee: CHS GMBH, Berlin (DE)

( * ) Notice: Subject to any disclaimer, the term of this patent is extended or adjusted under 35 U.S.C. 154(b) by 0 days.

(21) Appl. No.: 14/371,635

(22) PCT Filed: Dec. 20, 2012

(86) PCT No.: PCT/DE2012/100397
§ 371 (c)(1),
(2) Date: Jul. 10, 2014

(87) PCT Pub. No.: WO2013/104351
PCT Pub. Date: Jul. 18, 2013

(65) Prior Publication Data
US 2014/0360739 A1    Dec. 11, 2014

(30) Foreign Application Priority Data

Jan. 10, 2012 (DE) .......... 10 2012 100 177
Jun. 15, 2012 (DE) .......... 10 2012 105 191

(51) Int. Cl.
*A62C 3/00* (2006.01)
*A62C 2/06* (2006.01)
(Continued)

(52) U.S. Cl.
CPC . *A62C 3/14* (2013.01); *A62C 3/07* (2013.01); *A62C 3/08* (2013.01); *A62C 35/13* (2013.01);
(Continued)

(58) Field of Classification Search
CPC .............. A62C 3/07; A62C 3/14; A62C 3/08; A62C 35/13; A62C 37/11; A62C 37/14; A62C 37/16; A62C 37/36; A62C 99/009; B60H 1/00978
(Continued)

(56) References Cited

U.S. PATENT DOCUMENTS 3,698,204 A * 10/1972 Schlotterbeck ........ B60H 1/321
                                                    62/206
6,189,624 B1 * 2/2001 James .................... A62C 13/74
                                                    169/61
(Continued)

FOREIGN PATENT DOCUMENTS

DE     4118026      12/1992
DE     4207859      9/1993
(Continued)

OTHER PUBLICATIONS

International Search Report for PCT/DE2012/100397, English translation attached to original, Both completed by the European Patent Office on Mar. 3, 2014, All together 11 Pages.

*Primary Examiner* — Christopher Kim
*Assistant Examiner* — Viet Le
(74) *Attorney, Agent, or Firm* — Brooks Kushman P.C.

(57) ABSTRACT

A protection device, in particular a fire protection device on a motor vehicle. The device includes a fire fighting device having at least one container which is filled with an extinguishing agent and which can be paired with a body of a vehicle or an airplane or with a building wall or ceiling and comprising at least one outlet device which is to be closed by a temperature-controlled first valve, and/or the device includes at least one temperature-resistant tank which can be fluidically connected to an air conditioner, in which a negative pressure is present in order to receive a coolant of the air conditioner, and which is paired with at least one (Continued)

temperature-controlled second valve in order to open at least one flow channel for the coolant.

22 Claims, 3 Drawing Sheets

(51) Int. Cl.
    *A62C 3/07*     (2006.01)
    *A62C 35/13*     (2006.01)
    *A62C 37/16*     (2006.01)
    *A62C 37/36*     (2006.01)
    *A62C 99/00*     (2010.01)
    *B60H 1/00*     (2006.01)
    *A62C 3/08*     (2006.01)
    *A62C 37/11*     (2006.01)
    *A62C 37/14*     (2006.01)

(52) U.S. Cl.
    CPC ............... *A62C 37/11* (2013.01); *A62C 37/16* (2013.01); *A62C 37/36* (2013.01); *A62C 99/009* (2013.01); *B60H 1/00978* (2013.01); *A62C 37/14* (2013.01)

(58) Field of Classification Search
    USPC ............. 169/5, 9, 62, 54, 56, 60, 61, 66, 68
    See application file for complete search history.

(56) References Cited

U.S. PATENT DOCUMENTS

| | | | |
|---|---|---|---|
| 6,296,062 B1 * | 10/2001 | Sundholm | ............ A62C 3/0221 169/37 |
| 2003/0001129 A1 * | 1/2003 | Hubert | ................ A62D 1/0071 252/3 |

FOREIGN PATENT DOCUMENTS

| | | | | |
|---|---|---|---|---|
| DE | 19524199 | | 5/1996 | |
| DE | 10251794 | | 7/2004 | |
| EP | 1234600 | | 8/2002 | |
| EP | 1666287 | | 6/2006 | |
| EP | 2520339 A1 * | 11/2012 | ............ A62C 35/08 |
| GB | 2271058 | | 4/1994 | |
| GB | 2284015 | | 5/1995 | |
| GB | 2412864 | | 10/2005 | |
| WO | 0162344 | | 8/2001 | |
| WO | 2009114186 | | 9/2009 | |

* cited by examiner

PROTECTION DEVICE

CROSS-REFERENCE TO RELATED APPLICATION

This application is the U.S. national phase of PCT Application No. PCT/DE2012/100397 filed on Dec. 20, 2012, which claims priority to German Patent Application No. 10 2012 100 177.4 filed on Jan. 10, 2012 and German Patent Application No. 10 2012 105 191.7 filed on Jun. 15, 2012, the disclosures of which are incorporated in their entirety by reference herein.

The invention relates to a protection device, in particular a fire protection device in a motor vehicle, as well as uses for the protection device.

A large number of fire protection systems are known from practice, although they are generally only in stationary use. In the mobile sector, there are attempts to flood an engine compartment with an extinguishing agent, for example from a mobile fire extinguisher.

Furthermore, 2,3,3,3-tetrafluoropropene is often used in air-conditioning systems, particularly in motor vehicles, as a refrigerant, since this refrigerant can also be used in air-conditioning systems according to the state of the art that were developed for currently impermissible refrigerants, for example. This tetrafluoropropene is relatively climate-friendly, but combustible. Nevertheless, 2,3,3,3-tetrafluoropropene is to be used as a substitute substance for tetrafluoroethane as a refrigerant in air-conditioning systems of future motor vehicles. The classification of 2,3,3,3-tetrafluoropropene as extremely flammable and the formation of combustible gas-air mixtures are problematic. The explosive range is approx. between 6.2% by volume as the lower explosive limit and 12.3% by volume as the upper explosive limit. The spontaneous ignition temperature is stated at approx. 400° C. in the literature. In combustion, toxic and corrosive hydrogen fluoride is given off, and hydrofluoric acid can be produced when extinguishing a fire, for example after an accident.

Further known refrigerants are also non-problematic for the environment, provided that they are in a closed circuit.

The invention is based on the task of creating a protection device of the above-mentioned type that automatically prevents the spread of a fire and/or environmental damage.

According to the invention, the object is achieved by the features of the independent claims.

The sub-claims set out advantageous embodiments of the invention.

A protection device, in particular a fire protection device in a motor vehicle, comprises a fire-fighting mechanism comprising at least one container that is filled with extinguishing agent and assignable to a body of a vehicle or aeroplane or to the wall or ceiling of a building and comprises at least one discharge mechanism closed with a temperature-controlled first valve, and/or at least one temperature-resistant tank that can be connected to an air-conditioning system in a flow-related manner, in which tank a vacuum prevails in order to receive a refrigerant of the air-conditioning system, and to which tank a temperature-controlled second valve for opening at least one flow channel for the refrigerant is assigned.

The protection device can be an integral component of a vehicle, in particular of a motor vehicle, ship or aeroplane or also of a building or designed as a retrofit kit, and largely comprises the fire-fighting mechanism with the container filled with extinguishing agent and/or the at least one tank for receiving the refrigerant of the air-conditioning system.

For example, in the event of a fire, the first valve opens the discharge mechanism so that the extinguishing agent can exit the container through the discharge mechanism for fire-fighting purposes. Additionally or alternatively, the second valve opens a flow channel so that the refrigerant enters the tank by means of the vacuum prevailing in the tank. The tank is virtually self-priming and conveying devices are not necessarily required to transport the refrigerant from the air-conditioning system to the tank. The second valve is at least temperature-controlled, but can also be opened by means of alternative or additional signals, for example by means of an airbag signal if the tank is installed in a motor vehicle. There may also be a pressure sensor that opens the second valve in the event of a predetermined pressure drop in a specified time so that at least a predominant portion of the refrigerant of the air-conditioning system enters the tank and not the environment.

In an embodiment of the invention, the first and/or second valve comprises a small glass tube filled with a liquid and air that shatters at a predetermined temperature and clears a passage for the extinguishing agent or the refrigerant. In a known manner, at a specific temperature, an increased pressure builds up within the small glass tube, which causes the small glass tube to burst, thus releasing a valve seat. Depending on the liquid used, the small glass tubes are also to be operated at low temperatures, preferably down to approx. −30° C., and particularly preferably in any position and with no additional energy supply. For practical purposes, the small glass tube is inserted in a metal tube. The encapsulation of the small glass tube, made from aluminium, for example, by the metal tube results in reliable thermal conduction.

In an alternative embodiment, the first and/or second valve comprises a valve tappet made of a memory metal that clears at least one passage for the extinguishing agent or refrigerant at a specified temperature. In this embodiment too, no additional energy in addition to heat is required to open the valve.

In another alternative embodiment, the first and/or second valve is particularly formed as a pyrotechnic burst valve that can be opened as a result of information from the sensor. The valve itself may have a temperature-sensitive design, for example. However, by means of a sensor signal that indicates a fire, for example, it is also possible to send an electrical pulse to the valve designed as a pyrotechnic burst valve that can be arranged at a distance from the sensor and therefore particularly from the actual source of the fire in order to allow the extinguishing agent to be discharged from the container and extinguish the fire or to cause the refrigerant to enter the tank. Instead of a burst valve that enables abrupt release of the extinguishing agent or opening of the corresponding flow channel, a control valve with a corresponding drive can also be provided so that the extinguishing agent exits the container in a metered manner and/or the refrigerant enters the tank in a controlled manner.

The valve is to be opened either mechanically or electro-mechanically, or pyrotechnically, in particular by means of an electric pulse, preferably abruptly. The design of the valve is determined and chosen in accordance with the requirements for its opening speed, i.e. abrupt or continuous, for example, its opening and/or closing capabilities or its installation space. For targeted actuation, the valve is advantageously connected to an electronic control unit.

For the discharge mechanism to remain functional, particularly in a dusty environment, the discharge mechanism has a protective cap on its outlet that can be detached, preferably by the escaping extinguishing agent.

Preferably, the extinguishing agent is discharged from the container by the discharge mechanism assigned to the container, which mechanism particularly comprises a nozzle, either as a result of the overpressure prevailing in the container or in a gravity-controlled manner. The extinguishing agent can be distributed in a targeted manner by means of a nozzle or a type of sprinkler. If a pressure that pushes out the extinguishing agent prevails in the container or if the extinguishing agent is discharged from the container when the valve is opened, for example as a result of its weight pressure, it is not necessary to assign a conveying device, for example a pump, to the container. The conveying device may of course be advisable for transporting the extinguishing agent, and arrangement thereof is not completely precluded.

In the event of arson, to mark the person who caused the fire if applicable, a dye is discharged from the container for practical purposes when the extinguishing agent is discharged, and/or the extinguishing agent comprises the dye.

Preferably, the container is arranged on a body, within an engine compartment, preferably on an engine compartment cover, and/or within a vehicle interior, preferably on a roof structure, and/or in the area of a fuel tank and/or on a fuel cell and/or on a battery. Containers with extinguishing agent can be arranged wherever sufficient space is available; several containers can of course be provided in different places. As the protection device is not limited to use in a motor vehicle, the container can also be housed on a floor slab or in a plant room, for example also in a ship or aeroplane. Another aspect is possible fastening in places that arsonists prefer to select to start a fire in a parked motor vehicle, for example in the wheel arches or in the area of the fuel tank. Of course, the number of available stowage compartments for containers in holding during production of the motor vehicle may be greater than in subsequent attachment. The extinguishing agent may be formed as a gas, liquid, foam or the like. Various extinguishing agents that are advantageous in conjunction with different fire causes are known to a person skilled in fire-fighting.

According to a further embodiment, the tank is connected to a compressor or to a hose line of the air-conditioning system in such a way that when the second valve opens, the refrigerant is evacuated into the tank, with the tank serving as a storage reservoir, particularly when the air-conditioning system is in a switched-off state. The tank may be arranged in parallel with a line of the air-conditioning system, which of course does not necessarily have to be a hose line, i.e. a flexible line; a pipeline is also conceivable, particularly in the area that contains the tank. Preferably, several tanks are provided that receive the refrigerant present in the refrigerant circuit quickly in the event of damage. If the tank serves as a storage reservoir for the refrigerant when the air-conditioning system is in a switched-off state, i.e. if it receives at least a partial volume of the refrigerant present in the refrigerant circuit, this partial volume is stored relatively securely. To enable the refrigerant to reach the tank quickly, a venting valve can be assigned to the line for the refrigerant. Another aspect of the invention is that the tank serves for storage of the refrigerant when the air-conditioning system is not in operation. The tank may be shut off from the circuit by means of valves. Of course, a pump may also be installed in the refrigerant circuit in order to convey the refrigerant into the tank when the air-conditioning system is out of operation.

In a further embodiment, the tank receives the refrigerant by means of a vacuum. In a tank with a vacuum, the refrigerant is sucked out of the compressor or the refrigerant circuit into the tank when the valve is open in order to interact with the binding agent and/or neutralisation agent in order to prevent the formation of hydrofluoric acid or another pollutant, particularly when extinguishing a motor vehicle. This process is of course accelerated if a venting valve in the refrigerant circuit is opened at the same time.

Advantageously, the tank has a false floor that separates a vacuum area from a reservoir area and in which passages to be opened by the second valve are present. The second valve can be formed and arranged here in such a way that it generates a differential pressure when the flow channels are opened. For practical purposes, a medium for binding and/or neutralising the refrigerant, particularly a two-component binding agent or an absorbent mat, is present in the tank, preferably in the vacuum area thereof. The open-cell mat, a foam or the like, is able to receive the refrigerant and bind it if applicable. For receiving, i.e. binding, of the refrigerant, the medium may be open-cell, for example, and simultaneously react chemically with the refrigerant for neutralisation thereof. With a binding agent with two or more components, the components, which are also stored in different tanks or tank sections, must first be brought together in order to bring about the desired reaction.

For practical purposes, a coupling device with a penetration device for the hose line of the air-conditioning system is assigned to the tank. The coupling device opens and/or closes the flow connection between the tank and the refrigerant circuit of the air-conditioning system, for example as a result of a defined sensor signal. The coupling device may be equipped with the second valve, for example. The coupling device preferably comprises a penetration device for the hose line of the air-conditioning system. Accordingly, it is possible for a pin for piercing a hose line to be provided, with a flow channel for the refrigerant existing between the air-conditioning system and the tank after the hose line has been opened in such a way.

The tank is an integral component of a housing of the compressor of the air-conditioning system. Accordingly, the tank can be arranged in a relatively space-saving manner and produced and installed in conjunction with the compressor. Alternatively, several tanks are connected to the hose lines of the air-conditioning system.

The sensors used in connection with the protection device are known to a person skilled in the art, whereby a smoke sensor can of course be an optical or photoelectric smoke detector or an ionisation smoke detector. It only has to be noted here that ionisation smoke detectors react particularly sensitively to small smoke particles, such as those given off in a blazing fire or in diesel soot, and optical smoke detectors are better suited to early detection of smouldering fires with relatively large and bright smoke particles. The sensors, which may be arranged in any design and quantity in relevant places in the motor vehicle, for example in the engine compartment or luggage compartment or in the wheel arches or in the area of a fuel tank, are linked with each other, in particular via a vehicle bus system that also comprises relevant control units. In the event of corresponding signals from the sensors, which can also be activated when the motor vehicle is in the switched-off state, the protection mechanism—either locally limited or effective in the entire vehicle—is activated, for example using a control unit present in the motor vehicle or a separate computer of the protection device. As refrigerants used in connection with an air-conditioning system can be environmentally harmful or oxidising, when a fire is detected, the refrigerant is conveyed to the temperature-resistant tank for secure storage, and the tank is properly disposed of after fire-fighting.

To activate the protection device, for example according to the severity of an accident, a control unit is coupled with the sensor, which is connected to another sensor, preferably an airbag sensor. The control unit may be an airbag control unit in the motor vehicle that evaluates the signals from the airbag sensors, wheel sensors, acceleration sensors etc. connected thereto in order to ascertain an accident.

Preferably, the sensors, the valves and/or the at least one control unit are connected to the vehicle battery and/or an emergency battery and/or a trigger switch for energy supply. The emergency battery can also be installed as a sole energy source in the case of a retrofit kit, and the vehicle battery, particularly a starter battery, must not be overloaded. Manual activation of the fire protection device for extinguishing of a fire is possible by means of the trigger switch, which may be assigned to a dashboard in the interior of the motor vehicle or, designed as a remote-control switch, may be assigned to a remote-control key.

To transport refrigerant from the air-conditioning system to the protected tank in a simple manner, a vacuum prevails in the tank for evacuation of the refrigerant. The tank is virtually self-priming and conveying devices are not necessarily required to transport the refrigerant from the air-conditioning system to the tank.

Preferably, the tank receives the refrigerant by means of the vacuum and is connected to the control unit for an airbag. Accordingly, the refrigerant is conveyed from the air-conditioning system when the airbag is triggered and/or the sensors determine values that indicate a fire in the motor vehicle.

To ensure that the fire can be indicated, an optical and/or acoustic alarm device and/or a detection device is connected to the sensor. A data processing device, which may be the motor vehicle-based control unit, is assigned to the alarm device or the detection device. While the alarm device generates a signal that can be perceived in the surroundings of the motor vehicle, the detection device issues a message to a specified location by means of a GSM or radio module, for example. It is possible to send a predefined message to the owner of the motor vehicle or a service centre of the manufacturer that, in addition to the information that there is a fire, may contain positional data of the motor vehicle.

For example, in the case of damage to the compressor or to the refrigerant circuit connected to the compressor, the second valve may also open automatically or be opened, and the refrigerant is collected in the tank that has a binding agent and/or neutralisation agent for the refrigerant and stored in an environmentally harmless manner.

It is apparent to a person skilled in the art that the protection device and, in particular, the tank can be used in conjunction with different air-conditioning systems and is also not subject to any restrictions in terms of its application location. It may of course be a stationary air-conditioning system or an air-conditioning system installed on a vessel, i.e. a boat or a ship, an aeroplane or any other vehicle.

It is self-evident that the features mentioned above and explained below can not only be used in the respectively stated combination, but also in other combinations. The scope of the invention is defined only by the claims.

The invention is described in further detail below on the basis of embodiment examples with reference to the associated drawing.

Figure 1:
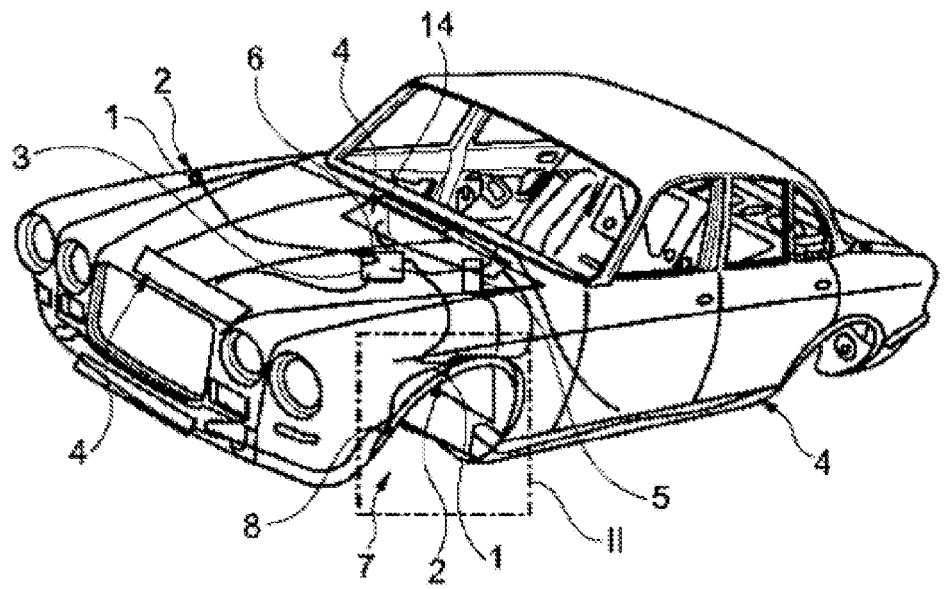
FIG. 1 shows a partial schematic representation of a motor vehicle with a protection device.
Figure 2:
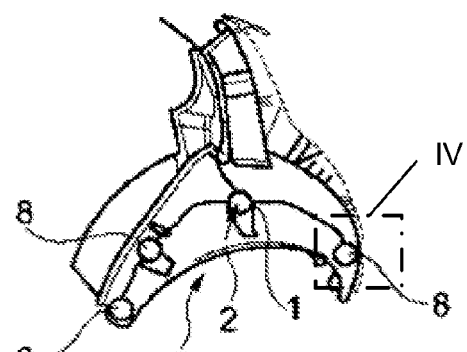
FIG. 2 shows a schematic representation of a detail II according to FIG. 1.
Figure 3:
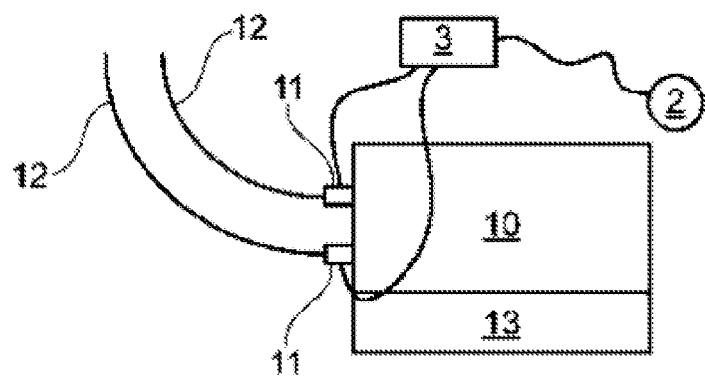
FIG. 3 shows a partial schematic representation of the protection device according to FIG. 1.
Figure 4:
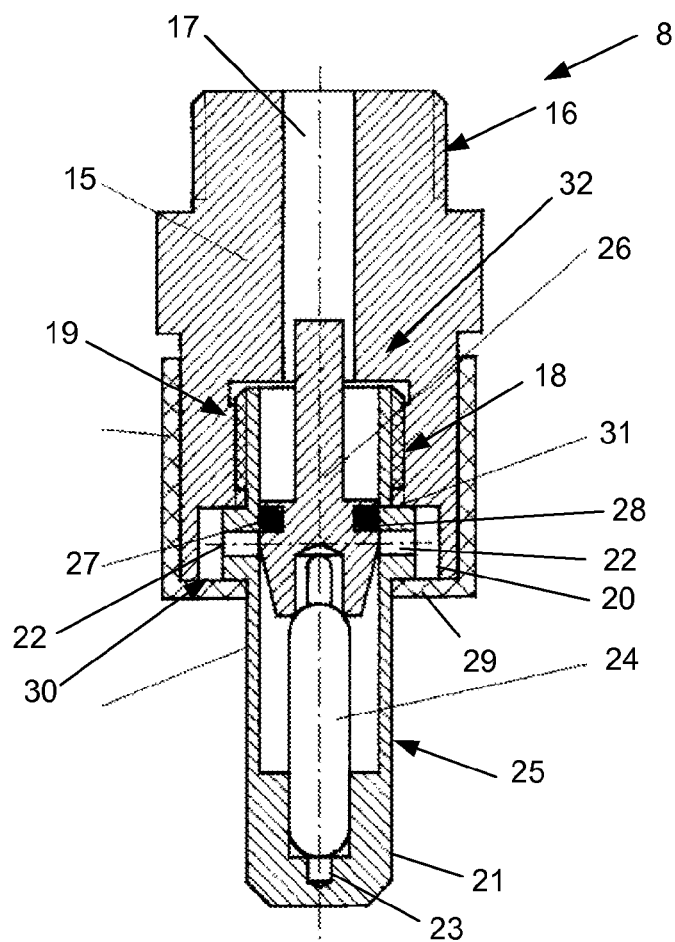
FIG. 4 shows a partial cross-section of a discharge mechanism of the protection device according to FIG. 1.
Figure 5:
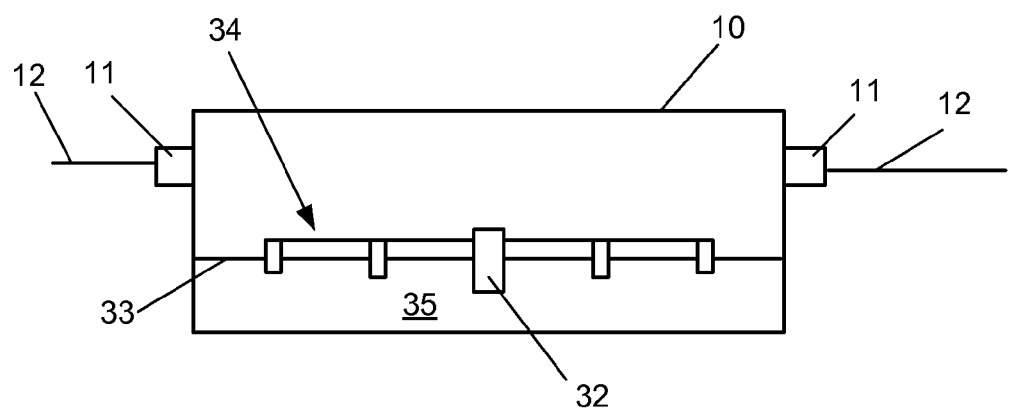
FIG. 5 shows a partial schematic representation of a tank of the protection device according to FIG. 1.
Figure 6:
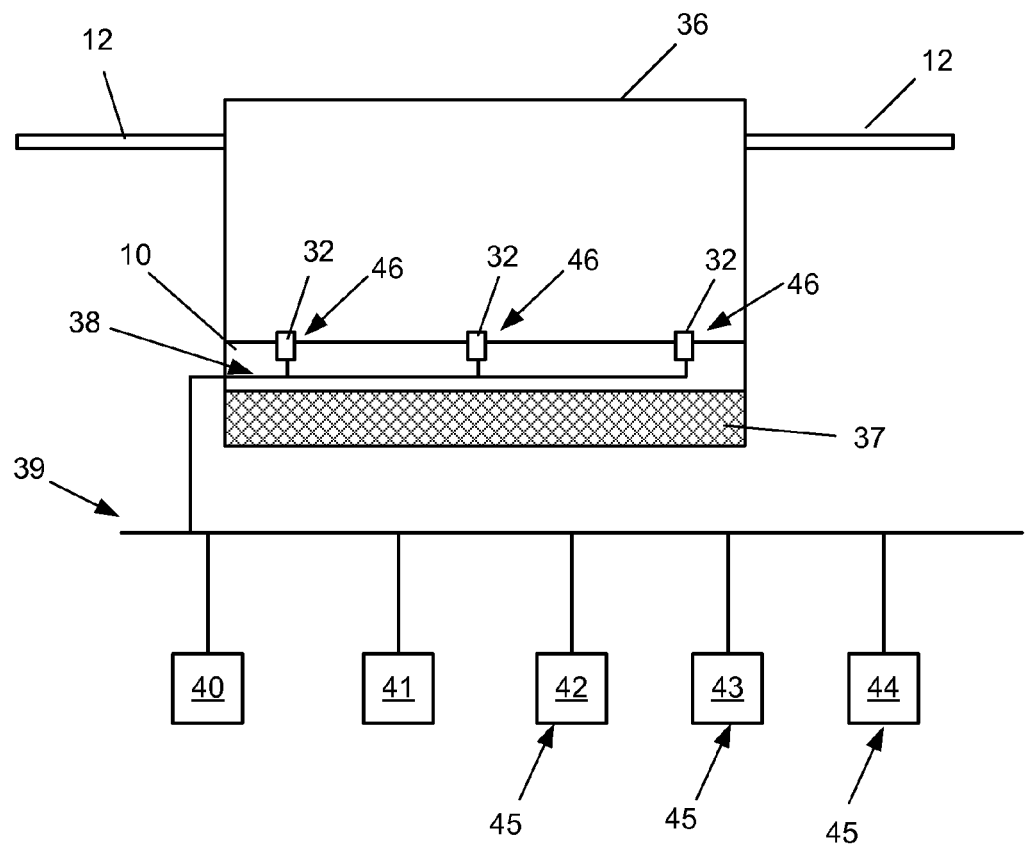
FIG. 6 shows a partial schematic representation of a compressor installed in a motor vehicle for an air-conditioning system with a protection device.
Figure 7:
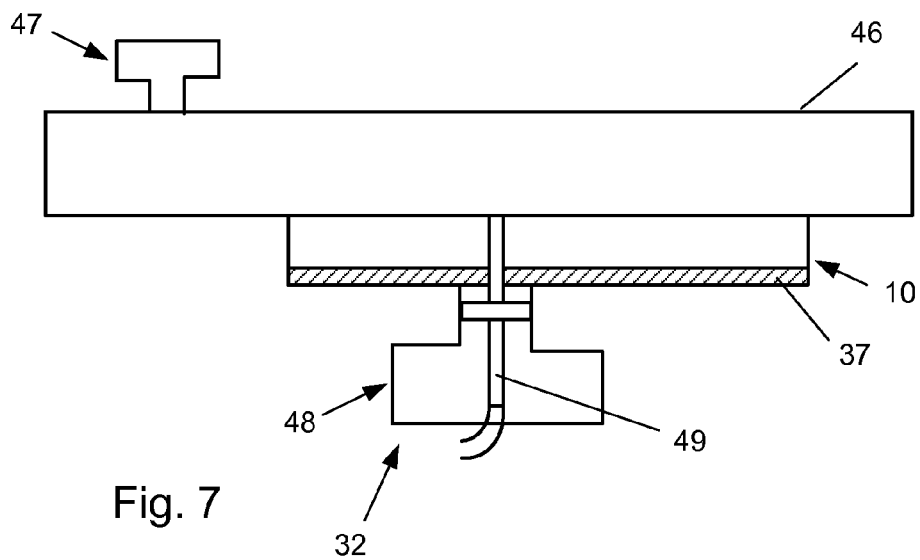
FIG. 7 shows an alternative design of a partial schematic representation of a tank of the protection device according to FIG. 1.

The protection device installed in the motor vehicle comprises several sensors 2, designed as temperature sensors 1, that are coupled with a control unit 3 that is in turn connected to first valves 5 attached to containers 4, with the containers 4 being fastened to the body and assigned to a fire-fighting mechanism and receiving extinguishing agent. The control unit 3 that evaluates the signals from the sensors 2 is a component of a vehicle bus system and is connected to an alarm and detection device 6. In the present case, the sensors are arranged in wheel arches 7 that also contain discharge mechanisms 8 for the extinguishing agent, which is released into the open as a result of an overpressure that prevails in the container 4. The discharge mechanisms 8 are connected to the container 4 via first valves 5.

In an embodiment, the discharge mechanism 8 comprising the temperature-controlled first valve 5 is largely formed of two parts and comprises a base body 15 that is connected either directly or via a line to the container 4 filled with extinguishing agent and is provided with an external thread 16, for example, for this purpose. The base body 15 has a concentric through-bore 17 that leads into a stepped bore 18 with an inside thread 19 and a cylindrical shoulder 20 enlarged in relation thereto. A nozzle head 21 that largely consists of a metal tube 25 is screwed into the inside thread 19 with circumferential discharge bores 22 that are radially aligned facing outwards in the area of the shoulder 20. The nozzle head 21 is closed at its end facing the base body 15, and its interior is provided with a centre bore 23 for a closed small glass tube 24, which holds a valve tappet 26 at its opposing end in such a position that extinguishing agent does not reach the discharge bores 22. For sealing in relation to the interior of the nozzle head 21, the valve tappet 26 has a rubber sealing ring 27 that is enclosed in a groove 28 of the valve tappet 26 and also seals against an inner wall of the metal tube 25. The small glass tube 24 has a fracture temperature of approx. 93° C. and is filled with a liquid and/or air. After failure of the small glass tube 24, the valve tappet 26 is displaced towards the closed end of the nozzle head 21 and clears the discharge bores 22.

To prevent soiling of the discharge bores 22, a protective cap 29 is provided that is held in a detachable manner on an outside diameter of the base body 15 and, at the front, covers a ring-shaped outlet 30 that is formed between the cylindrical shoulder 20 and a ring-shaped attachment 31 of the nozzle head 21, which attachment contains the discharge bores 22. When the extinguishing agent is discharged, the protective cap 29 is removed by the pressure thereof and clears the outlet 30.

To receive refrigerant of an air-conditioning system in the event of damage, for example in the event of a fire or accident or the like, a temperature-resistant tank 10 is provided, which is connected to hose lines 12 of the air-conditioning system via coupling devices 11. The tank 10, in which a vacuum prevails, contains a medium 13 for receiving and binding the refrigerant. Flow channels for the refrigerant can be cleared by means of a second temperature-controlled valve 32, whose structure corresponds to the first temperature-controlled valve 5 described above. In an alternative embodiment, the second valve 32 is opened by means of a signal caused by a sensor 2.

In a further alternative embodiment, the tank 10 has a false floor 33 in which flow channels are cleared by means of a valve device 34 that comprises the second valve 32. If the air-conditioning system is not in operation, the tank 10 can serve as a reservoir for the refrigerant. In the event of damage, the valve device 34 is opened by the second valve 32 and the flow channels are cleared in the false floor 33. As a result of the vacuum in the area 35 of the tank 10 that is delimited from the surrounding area by the false floor 33, the refrigerant is evacuated here and bound by the medium present in this area 35 in such a way that it can be properly disposed of without damage to the environment.

In a further alternative embodiment, a compressor 36 for the air-conditioning system of the motor vehicle, which system is operated with 2,3,3,3-tetrafluoropropene as a refrigerant, for example, is connected to the refrigerant circuit as suggested by the two hose lines 12. The compressor 36 is connected to the tank 10 via flow channels 46 that have several second valves 32. The tank 10 contains the medium for binding and/or neutralising the refrigerant, which in this case is designed as an absorbent mat 37 that has specific mechanical and chemical properties determined by a person skilled in the art, particularly in accordance with the refrigerant used.

The second valves 32 are connected via lines 38 to an on-board power supply 39 of the motor vehicle to which a battery 40, a control unit 41 and various sensors 45 are connected, the latter being formed as a temperature sensor 42 and/or a smoke sensor 43 and/or an airbag sensor 44, for example. If an accident is detected by the sensors 45, particularly in connection with a fire, actuation of the valves 32 is effected to open the flow channels 46 so that the refrigerant enters the tank 10 and is bound by the mat 37 so that no further damage is caused. To support evacuation of the refrigerant, a pump can be provided, for example, or a vacuum prevails in the tank 10.

With an alternative embodiment of the first valve 5, of which a large number may of course be installed, the extinguishing agent is released from at least one container 4 if the sensors 2 measure a temperature that indicates a fire or detect a corresponding smoke build-up. A corresponding signal is in contact with the control unit 3 assigned to the sensors 2. After signal processing, the control unit 3 effects opening of the valve 5 assigned to the container 4, whereupon the extinguishing agent is discharged from the discharge mechanisms 8 in order to extinguish the fire, particularly at the location close to the detecting sensor 2. At the same time, a corresponding signal goes to the coupling devices 11 and the second valves 32 of the tank 10, which penetrate the assigned hose lines 12 of the air-conditioning system or open corresponding flow channels inside the tank 10. As a result of the vacuum that prevails in the tank 10, the refrigerant is evacuated from the air-conditioning system and securely stored in the tank 10, which can be locked by the coupling devices 11, for example after a specified period of time. In addition, a signal regarding the fire in the motor vehicle is issued by means of any provided alarm and detection device 6.

In a further alternative embodiment, the tank 10 is partially connected to a line 46, either a pipeline or hose line, or is an integral component of the line 46, which line 46 has a venting valve 47 that vents it in the event of a vacuum in said line. A burst valve 48 that comprises a valve tappet 49 mounted in a moveable manner for opening or closing an opening in the line 46 in the area of the tank 10 having a vacuum and the mat 37 is assigned to the tank 10. By means of the displacement of the valve tappet 49, opening of the burst valve 48 generates a differential pressure that aids conveying of the refrigerant from the line 46 to the tank 10, with the venting valve 47 opening simultaneously. Several line sections fitted with tanks 10 may of course be present in a refrigerant circuit.

For the methods described above also to be executed by an occupant of the motor vehicle, a trigger switch 14 connected to the control unit 3 and thus to all main components is provided in the interior of the motor vehicle.

The protection device can of course be used not only in a motor vehicle, but also on vessels, aeroplanes, mobile and/or stationary air-conditioning systems without leaving the scope of the invention. By means of the protection device, a fire can be fought and/or a refrigerant of an air-conditioning system can be bound.

List of references

1. Temperature sensor
2. Sensor
3. Control unit
4. Container
5. First valve
6. Alarm and detection device
7. Wheel arches
8. Discharge mechanism
9.
10. Tank
11. Coupling device
12. Hose line
13. Medium
14. Trigger switch
15. Base body
16. External thread
17. Through-bore
18. Stepped bore
19. Inside thread
20. Shoulder
21. Nozzle head
22. Discharge bores
23. Centre bore
24. Small glass tubes
25. Metal tube
26. Valve tappet
27. Rubber sealing ring
28. Groove
29. Protective cap
30. Outlet
31. Attachment
32. Second valve
33. False floor
34. Valve device
35. Area
36. Compressor
37. Mat
38. Line
39. On-board power supply
40. Battery
41. Control unit
42. Temperature sensor
43. Smoke sensor
44. Airbag sensor
45. Sensor
46. Flow channel
47. Venting valve
48. Burst valve
49. Valve tappet

The invention claimed is:

1. A protection device, in particular a fire protection device in a motor vehicle, with a fire-fighting mechanism comprising:
   at least one container that is filled with an extinguishing agent and attachable to a body of a vehicle, aeroplane or to a wall or ceiling of a building;
   at least one discharge mechanism closed with a temperature-controlled first valve,
   at least one temperature-resistant tank that can be connected to an air-conditioning system in a flow-related manner, in which tank a vacuum prevails in order to receive a refrigerant of the air-conditioning system, and
   a temperature-controlled second valve for opening at least one flow channel to transfer refrigerant from the air-conditioning system to the at least one temperature-resistant tank in the event of a fire;
   wherein in the event of a fire the temperature-controlled first valve opens to discharge extinguishing agent and the temperature-controlled second valve opens to transfer the refrigerant in order to prevent refrigerant from escaping in a fire.

2. The protection device according to claim 1, wherein the first and/or second valve comprises a small glass tube filled with a liquid that shatters at a predetermined temperature to open the associated valve.

3. The protection device according to claim 2, wherein the small glass tube is inserted in a metal tube.

4. The protection device according to claim 1, wherein the first and/or second valve comprises a valve tappet made of a memory metal that clears at least one passage for the extinguishing agent or refrigerant at a specified temperature.

5. The protection device according to claim 4, wherein the first and/or second valve is particularly formed as a pyrotechnic burst valve that can be opened as a result of information from the sensor.

6. The protection device according to claim 1, wherein the discharge mechanism has a protective cap on its outlet that can preferably be detached by the escaping extinguishing agent.

7. The protection device according to claim 1, wherein the extinguishing agent is discharged from the container by the discharge mechanism assigned to the container, which mechanism comprises a nozzle, either as a result of the pressure prevailing in the container or in a gravity-controlled manner.

8. The protection device according to claim 1, wherein when the extinguishing agent is discharged, a dye is discharged from the container and/or the extinguishing agent comprises the dye.

9. The protection device according to claim 1, wherein the container is arranged on a body, within an engine compartment, within a vehicle interior, in the area of a fuel tank or adjacent a battery.

10. The protection device according to claim 1, wherein the tank is connected to a compressor or to a hose line of the air-conditioning system in such a way that when the second valve opens, the refrigerant is evacuated into the tank, with the tank serving as a storage reservoir, particularly when the air-conditioning system is in a switched-off state.

11. The protection device according to claim 1, wherein a coupling device with a penetration device for a hose line of the air-conditioning system is assigned to the tank.

12. The protection device according to claim 1, wherein the second valve opens and/or closes the flow connection with the refrigerant circuit of the air-conditioning system as a result of a defined sensor signal.

13. The protection device according to claim 1, wherein the tank is an component of a housing of a compressor of the air-conditioning system.

14. The protection device according to claim 1, wherein several tanks are connected to hose lines of the air-conditioning system.

15. The protection device according to claim 1, wherein at least one sensor formed as a temperature sensor and/or smoke sensor is connected to the first and/or second valve.

16. The protection device according to claim 1, wherein sensors, the valves and/or the at least one control unit are connected to the vehicle battery and/or an emergency battery for energy supply.

17. The protection device according to claim 1, wherein an optical and/or acoustic alarm device and/or a detection device is connected to the sensor.

18. The protection device according to claim 1, wherein a control unit an airbag sensor, and/or a control unit for an airbag.

19. The protection device according to claim 1 as a retrofit set for a motor vehicle.

20. Vehicle or aeroplane with a protection device according to claim 1.

21. A fire protection device in a motor vehicle comprising:
   a temperature-resistant tank that can be connected to an air-conditioning system in a flow-related manner, in which tank a vacuum prevails in order to receive a refrigerant of the air-conditioning system, and
   a temperature-controlled second valve for opening at least one flow channel to transfer refrigerant from the air-conditioning system to the at least one temperature-resistant tank in the event of a fire;
   wherein the tank has a shared common wall that separates a vacuum area from a reservoir area and in which passages to be opened by the second valve are present.

22. A fire protection device in a motor vehicle, comprising:
   a temperature-resistant tank that can be connected to an air-conditioning system in a flow-related manner, in which tank a vacuum prevails in order to receive a refrigerant of the air-conditioning system, and
   a temperature-controlled second valve for opening at least one flow channel to transfer refrigerant from the air-conditioning system to the at least one temperature-resistant tank in the event of a fire;
   a medium for binding and/or neutralising the refrigerant, is present in the tank.

* * * * *